United States Patent [19]

Horman et al.

[11] 4,297,380

[45] Oct. 27, 1981

[54] TEA FLAVORING PROCESS AND PRODUCT

[75] Inventors: Ian Horman, Corseaux; Paul Cazenave, Chavornay, both of Switzerland

[73] Assignee: Societe d'Assistance Technique pour Produits Nestle S.A., Lausanne, Switzerland

[21] Appl. No.: 771,075

[22] Filed: Feb. 23, 1977

Related U.S. Application Data

[63] Continuation of Ser. No. 519,627, Oct. 31, 1974, abandoned.

[51] Int. Cl.$^3$ .................. A23F 3/40; A23L 1/226
[52] U.S. Cl. .................. 426/597; 426/536; 426/538
[58] Field of Search ............... 426/534, 536, 538, 597

[56] References Cited

U.S. PATENT DOCUMENTS

| | | | |
|---|---|---|---|
| 3,005,715 | 10/1961 | Raffensperger | 426/538 |
| 3,414,412 | 12/1968 | Kovats | 426/538 |
| 3,634,098 | 1/1972 | Rhoades et al. | 426/534 |
| 3,634,101 | 1/1972 | Rhoades et al. | 426/534 |
| 3,645,755 | 2/1972 | Sakato et al. | 426/536 |
| 3,676,156 | 7/1972 | Bentz | 426/597 |
| 3,702,253 | 11/1972 | Winter et al. | 426/536 |
| 3,966,986 | 6/1976 | Hunter et al. | 426/597 X |

FOREIGN PATENT DOCUMENTS

1306017  2/1973  United Kingdom ............... 426/597

OTHER PUBLICATIONS

Fenaroli's Hnbk. of Flavor Ingred., pp. 353, 376, 409, 502, 521, 660, Chem. Rubber Co., 1971.
Synthetic Food Adjuncts, pp. 135, 136, 320, Jacobs, Van Nostrand.
Perfume & Flavor Chemicals, #1432, 1787, 2002, 2664, 3059, Arc Tander, 1969.
Chemicals Used in Food Proc., Natl. Acad. Sciences, 1965, p. 202
Helvetica Chimica Acta, vol. 57 (1974), pp. 206-208, 209-211.
Geuich-und Geschmackstoffe Drawert, 1975, Black Tea Aroma & Its Form., Sanderson, pp. 69-76.

*Primary Examiner*—Steven L. Weinstein
*Attorney, Agent, or Firm*—Vogt and O'Donnell

[57] ABSTRACT

A flavoring agent is provided for a tea composition to impart various flavors. The flavoring agent is selected from the group consisting of anthranilic acid, N-methyl anthranilate and N,N-dimethyl anthranilate acid in an amount of 0.25 to 200 ppm of ester based on the weight of the soluble tea solids. The flavoring agent may also comprise geranyl acetone and δ-decalactone.

30 Claims, No Drawings

TEA FLAVORING PROCESS AND PRODUCT

This is a continuation of application Ser. No. 519,627, filed Oct. 31, 1974, now abandoned.

This invention relates to the aromatising of beverages. More particularly, the invention is concerned with strengthening the aroma of tea in beverages based on tea.

Instant teas are generally prepared by extracting black tea leaves followed by concentration and, if desired, drying. During these operations, however, a large part of the volatile substances responsible for flavour is lost. In some cases, they can be recovered by condensation and then re-incorporated in the tea extract. In most cases, however, the aforementioned volatile substances have undergone changes which make them unsuitable for re-incorporation. In cases such as these, it may be advisable to aromatise the extract with suitable compositions.

British Patent Specification No. 1,306,017 describes certain compositions used as aroma strengtheners in tea for imparting a note of freshness. These compositions are mostly based on compounds whose presence in the aroma of tea is well known. In addition, they are frequently highly complex.

The present invention relates to a process for aromatising a beverage based on tea, distinguished by the fact that an aromatising agent containing at least one ester of anthranilic acid capable of strengthening the tea aroma is added to the beverage in such a quantity that the beverage contains from 0.25 to 200 ppm of ester, based on the weight of the soluble tea solids. Esters of this kind are, for example, methyl, ethyl and propyl anthranilates, also methyl N-methyl anthranilate and methyl N,N-dimethyl anthranilate.

Although not absolutely essential, it is possible to add to the beverage an aromatising agent which, in addition to one or more esters of an anthranilic acid, contains geranyl acetone, optionally accompanied by γ-valerolactone, and also δ-decalactone and/or lactone of jasmine, i.e. aromatising compositions containing at least one ester of an anthranilic acid. Hereinafter the term alkyl anthranilate(s) will be used to designate at least one ester of an anthranilic acid such as referred to above. In the context of the invention, a tea based beverage, apart of course from the conventional infusion of tea leaves, may be any of the beverages known as "instant teas" which are aqueous solutions of aromas and soluble tea extracts, especially solids, capable of additionally containing various additives, such as citric acid for example. In this case, the term beverage as used in the context of the invention applies both to the liquid reconstituted beverage and also to the extract of the solids before or after drying, which means that the aromatising agent may be added before, during or after reconstitution of the liquid beverage by the addition of water. Thus, although the quantities specified hereinafter are expressed in terms of weight with reference to the soluble solids of the tea, this does not imply that the aromatising agent is added to the solids themselves. It is merely one convenient method of presentation, because the addition can be made for example either to the extract of the solids before drying or to the reconstituted liquid beverage.

When added to a tea-based beverage in quantities of from 0.25 to 3 ppm and preferably in quantities of from 0.5 to 2 ppm, based on the weight of the soluble solids in the tea, methyl anthranilate imparts to that beverage a hint of black tea which is particularly appreciated among certain consumers. When used in a higher concentration, it imparts a flowery jasmine note, and then a distinctly unpleasant pharmaceutical note. Ethyl anthranilate and methyl N-methyl anthranilate have very similar aromatising properties. When added to tea in quantities of from 0.5 to 10 ppm and preferably in quantities of from 1 to 5 ppm, they impart to it a round and agreeably fruity note. Propyl anthranilate is added to tea in quantities of from 8 to 50 ppm and preferably in quantities of from 10 to 40 ppm. For example, 10 ppm of this ester imparts a hint of freshness to tea, whilst an addition of 30 ppm produces a slight floral note. In addition, this floral note, although becoming very strong beyond 50 ppm, does not turn into a "pharmaceutical" note. Finally, the addition to tea of methyl N,N-dimethyl anthranilate in quantities of from 25 to 150 ppm, preferably in quantities of from 75 to 100 ppm, imparts a subtle musky note.

The use of an agent or composition containing one ester or another is of course governed by the note which it is desired to impart to the tea-based beverage, and also by the organoleptic quality of the tea base to be aromatised. It is also possible, if desired, to use compositions containing mixtures of these esters such as, for example, compositions containing mixtures of methyl anthranilate and methyl N,N-dimethyl anthranilate, in which case considerable benefit is derived from the strong aromatising power of methyl anthranilate insofar as it enables methyl N,N-dimethyl anthranilate to be used in smaller quantities than would normally be necessary. In cases where anthranilate mixtures are used, they are added in such quantities that they fall within the quantitative limits for the anthranilate with the strongest aromatising power.

In addition to at least one ester of an anthranilic acid, the aromatising composition may contain interesting substances such as those which have already been mentioned or which will be mentioned hereinafter. It has been found that methyl, ethyl and propyl anthranilates and methyl N-methyl anthranilate give compositions which impart to tea aromatic notes that go in the same direction (flowery), which means that these four esters are more or less interchangeable. On the other hand, compositions containing at least methyl N,N-dimethyl anthranilate impart to tea a note of the musky type instead.

Thus, the addition to a tea-based beverage of the following compositions:

| alkyl anthranilate(s) | 1 part |
|---|---|
| geranyl acetone | 0.5 to 2 parts | in such quantities that the beverage contains from 0.25 to 3 ppm of methyl anthranilate or from 0.5 to 10 ppm of ethyl anthranilate or methyl N-methyl anthranilate or even 8 to 50 ppm of propyl anthranilate, imparts to the beverage a very intense, flowery aroma as well as a slightly aggressive flavour. If the anthranilate used is methyl-N,N-dimethyl anthranilate, the compositions added in such a quantity that the tea contains from 25 to 150 ppm of this ester impart to the tea a fresh, musky fullness.

It is possible, if desired, to use as aromatising agent compositions such as those which we have just defined, but which additionally contain γ-valerolactone in the following proportions:

| alkyl anthranilate(s) | | 1 part |
|---|---|---|
| geranyl acetone | } | |
| γ-valerolactone | | 1 to 2 parts | these compositions being added under the same conditions as the more simple compositions which do not contain γ-valerolactone.

All the compositions consisting of mixtures of alkyl anthranilate(s) and δ-decalactone have a profound effect upon the flavour of the beverages to which they are added, irrespective of the relative proportions of the two constituents:

| alkyl anthranilate(s) | } | in any proportions, |
|---|---|---|
| δ-decalactone | | | the particularly desirable proportions of the compositions being as follows:

| alkyl anthranilate(s) | 1 part |
|---|---|
| δ-decalactone | 0.1 to 10 parts | for example 1 part of methyl anthranilate to 2 parts of δ-decalactone, these compositions having to be used in such quantities that they are present in the beverage in quantities falling within the quantitative limits for anthranilates. For example, compositions containing methyl anthranilate are particularly advantageous in quantities of from 2 to 5 ppm and preferably in quantities of from 3 to 4.5 ppm, which for the particularly desirable compositions corresponds to values in the range from 0.66 to 2 ppm of methyl anthranilate.

In addition, it has been found that δ-decalactone and lactone of jasmine have a similar effect. In practice, they are equivalent and hence interchangeable at least in the case of simple mixtures, such as for example binary and ternary mixtures. However, they are not quantitatively equivalent because it has been found that, in approximate terms, 50 parts of lactone of jasmine are required to replace approximately 1 part of δ-decalactone in obtaining a similar flavour. Accordingly, the mixtures of alkyl anthranilate(s) and lactone of jasmine are added to the tea extracts in quantities of from 50 to 250 ppm. Similarly, ternary mixtures of δ-decalactone, alkyl anthranilate(s) and lactone of jasmine are comparable in their function to mixtures of δ-decalactone and alkyl anthranilate(s), the δ-decalactone being completely or partly replaceable by lactone of jasmine, taking into account the approximate correspondence which we have just described for the compositions and the limits to the quantities used. If necessary, these particular compositions may themselves also contain geranyl acetone and/or γ-valero lactone. Thus, the following compositions:

| alkyl anthranilate(s) | } | 50 parts |
|---|---|---|
| lactone of jasmine | | |
| geranyl acetone | | 1 to 2 parts | for example 2 parts of alkyl anthranilate(s) to 48 parts of lactone of jasmine and 1 part of geranyl acetone or

| alkyl anthranilate(s) | | |
|---|---|---|
| lactone of jasmine | } | 25 to 50 parts |
| geranyl acetone | | |
| γ-valerolactone | | 1 part | will be used in the same way as the more simple mixtures consisting solely of alkyl anthranilate and lactone of jasmine.

It should be pointed out that, although geranyl acetone on its own is not a very interesting aromatising agent in view of its terpenic aromatic note and its bitter flavour, its entire interest is as a constituent of aromatising compositions. Thus, the following compositions:

| geranyl acetone | 1 part |
|---|---|
| δ-decalactone | 1 to 2 parts | provide the tea-based beverage with a balanced aroma, although bitterness reappears with greater relative proportions of geranyl acetone. These compositions have to be added in quantities corresponding to quantities of γ-decalactone of from 0.5 to 9 ppm, preferably from 1 to 6 ppm, based on the solids in the tea.

In cases where it is desired to aromatise low-quality tea extracts which, apart from the subtle note inherent in them, have lost their aromatic tea base, it is best to use compositions which additionally contain compounds of average volatility capable of restoring the aforementioned aromatic base such as, for example, linalol, oxide of linalol (i.e. linalol oxide I, linalol oxide II or a mixture, commercial or otherwise, of both oxides), 2-hexenal, which are all well known constituents in the aroma of tea. For example, the following compositions:

| alkyl anthranilate(s) | } | 3 to 5 parts |
|---|---|---|
| lactone of jasmine | | |
| linalol | | 5 to 7 parts |
| oxide of linalol | | 1 to 2 parts |
| or | | |
| alkyl anthranilate(s) | } | 1.5 to 3 parts |
| geranyl acetone | | |
| γ-valerolactone | | |
| linalol | | 50 to 70 parts |
| oxide of linalol | | 10 to 20 parts |
| or even | | |
| alkyl anthranilate(s) | } | 26 to 28 parts |
| lactone of jasmine | | |
| geranyl acetone | | |
| γ-valero lactone | | |
| linalol | | 50 to 70 parts |
| to which from 10 to 20 parts of oxide of linalol and then 10 to 20 parts of 2-hexenal may be added. | | |

In all the compositions specified above, the relative proportions of the compounds which are expressed in the form of total quantities by weight are of the same order of magnitude as in the more simple compositions containing those compounds alone and no other compound.

In addition, the compositions containing, in addition to alkyl anthranilate, compounds of average volatility (linalol, oxide of linalol, 2-hexenal) have an aromatising power which is obviously governed by their nature. As a general rule, they are used as aromatising agents in such quantities that the final tea extract contains alkyl anthranilate in a quantity approximately the same as that which would be present had alkyl anthranilate alone been used as aromatising agent, i.e. from 0.25 to 3 ppm of methyl anthranilate or from 0.5 to 10 ppm of ethyl anthranilate or methyl N-methyl anthranilate or from 8 to 50 ppm of propyl anthranilate or even from 25 to 150 ppm of methyl N,N-dimethyl anthranilate. However, additive effects are frequent. For example, compositions containing lactone of jasmine can be effective from a level of 20 ppm to 30 ppm of this compound, which corresponds for example to less than 0.25 ppm of methyl anthranilate. A first preferred beverage is the following:

| methyl anthranilate | 0.70 part |
|---|---|
| lactone of jasmine | 70 parts |
| soluble tea solids | 1 000 000 parts | another preferred beverage:

| methyl anthranilate | 0.5 part |
|---|---|
| geranyl acetone | 0.4 part |
| γ-valerolactone | 1.5 part |
| linalol | 60 parts |
| oxide of linalol | 15 parts |
| soluble tea solids | 1 000 000 parts | and yet another:

| geranyl acetone | 1.5 part |
|---|---|
| δ-decalactone | 3 parts |
| soluble tea solids | 1 000 000 parts |

Other preferred beverages have a clean black tea flavour which, among certain connoisseurs, is synonymous with quality:

| methyl anthranilate | 0.75 part |
|---|---|
| soluble tea solids | 1 000 000 parts |
| or ethyl anthranilate | 1.5 part |
| soluble tea solids | 1 000 000 parts |
| or propyl anthranilate | 30 parts |
| soluble tea solids | 1 000 000 parts |
| or methyl N-methyl anthranilate | 2 parts |
| soluble tea solids | 1 000 000 parts |
| or methyl anthranilate | 1 part |
| methyl N,N-dimethyl anthranilate | 20 parts |
| soluble tea solids | 1 000 000 parts |
| or methyl anthranilate | 2 parts |
| geranyl acetone | 1 part |
| γ-valero lactone | 4 parts |
| soluble tea solids | 1 000 000 parts |

The process according to the invention can be carried out in many different ways.

In a first embodiment, an infusion of tea or a liquid reconstituted tea in any concentration, hot or cold, is treated with an aromatising agent, i.e. with at least one ester of an anthranilic acid. To this end, the aromatising agent may be directly added or, where it is a composition, its constituents may be added either individually or in combination, after which the whole is homogenised. The same procedure can of course be adopted for a liquid extract of tea solids intended, after drying, to give an instant tea powder. Since the aromatising agent on the one hand is relatively simple and, on the other hand, consists of stable, substantially non-volatile substances, the increase in temperature which may occur during drying does not have any serious disadvantages. In one preferred modification of this first embodiment, the aromatising agent or its constituents are added not as such but in solution or emulsion in a diluent, the quantities of aromatising agent to be incorporated in the beverage being proportionally very small and, where the volume of this beverage is reduced, so small as to allow any dosage. It is preferred to use a so-called "food-grade" diluent, for example water or an aqueous alcoholic solution.

A second embodiment of the process according to the invention comprises treating a solid tea extract, for example in powder form. In a first modification of this embodiment, the aromatising agent is added directly to the powder, followed by homogenisation, for example in a rotary cylinder. In another modification, designed for aromatising compositions, the constituents of the composition may be added either individually or in combination, followed by homogenisation. In another preferred modification, the aromatising agent is added to a small fraction of the tea powder to be treated, for example 5 to 10%, which facilitates addition, after which this fraction is mixed with the rest of the powder, followed by homogenisation until the aromatising agent is uniformly distributed throughout the powder. In the case of aromatising compositions, it is also possible, in another preferred embodiment of the invention, individually to add each of the constituents to as many small fractions of the tea powder, subsequently to combine all the fractions and the untreated powder and then to homogenise the whole, the aforementioned fractions either being equal in weight or selected in a ratio by weight constant with the quantity of constituent to be added to it, so that each of the fractions is aromatised to the same extent. For the same reasons as those described above, the aromatising agent or its constituents are not added as such in preferred modifications of all these embodiments, but in solution or emulsion in a diluent, preferably a "food-grade" diluent. In this case, it may be that the quantity of diluent used is sufficient to dissolve the fraction of treated tea powder. During these treatments, dispersion of the aromatising agent can be facilitated by a slight increase in temperature. Finally, the instant tea is reconstituted, for example, simply by adding water to the powder.

The process according to the invention is illustrated by the following Examples. In these Examples, the aqueous alcoholic solutions referred to are solutions containing 10% of ethanol, whilst the values expressed in ppm are based on the tea solids.

EXAMPLE 1

0.6 ml of an aqueous emulsion containing 37.5 mg per liter of methyl anthranilate are added to the contents of an infusion of tea of approximately 10 liters prepared by the decoction of 250 g of tea leaves, followed by vigorous stirring. The tea has a solids content of 3 g per liter, which means that it contains 0.75 ppm of the aromatising anthranilate. The tea thus treated is then submitted to a jury of tasters and amateurs who, after blindfolding, have to indicate their preference between the aromatised tea and a non-aromatised reference tea of the same kind. 8 tasters out of 8 preferred the aromatised tea, describing it as agreeably flowery and having a marked black-tea note. By way of comparison, similar aromatisation in a quantity of 0.5 ppm produced a tea which was preferred by 4 tasters out of 5 and which was described as having a jasmine note, whilst aromatisation in a quantity of 3.5 ppm, in the unanimous opinion of the tasters, gave the tea a strong aroma and an unpleasant pharmaceutical note.

EXAMPLE 2

A tea aromatised with 1.5 ppm of ethyl anthranilate in accordance with the procedure described in Example 1 is preferred by 9 tasters out of 9. It is described as having a fruity note.

EXAMPLE 3

A tea aromatised with 30 ppm of propyl anthranilate in accordance with the procedure described in Example 1 is preferred by 8 tasters out of 10 who described it as having a slight floral note.

EXAMPLE 4

A tea aromatised with 2 ppm of methyl N-methyl anthranilate in accordance with the procedure described in Example 1 is preferred by 7 tasters out of 9 and has a note which although agreeably fruity, is different from that of the tea of Example 2.

EXAMPLE 5

A tea aromatised with 85 ppm of methyl N,N-dimethyl anthranilate in accordance with the procedure of Example 1 is preferred by 6 tasters out of 11, and has a subtle musky note.

EXAMPLE 6

An instant tea is prepared by dissolving in 6.5 liters of hot water 20 g of tea powder (obtained by drying a hot aqueous extract of the tea solids), followed by the addition of 3 ml of an aqueous emulsion of 15 mg per liter of an aromatising agent containing 1 part of methyl anthranilate to 2 parts of δ-decalactone (0.75 ppm of anthranilate). This tea was preferred to the non-aromatised reference tea by 4 tasters out of 5 who described it as being fuller and slightly more aggressive. By way of comparison, 3 tasters out of 5 preferred a tea aromatised with this same mixture, but in twice the quantity, describing it as flowery, fruity and particularly agreeable with milk.

EXAMPLE 7

Following the procedure of Example 6, a tea is aromatised with a composition consisting of 1 part of methyl anthranilate and 20 parts of methyl N,N-dimethyl anthranilate. The aromatising composition is added in such a quantity that the tea contains 1 ppm of methyl anthranilate. This tea is preferred by 7 tasters out of 7 who describe it as having body and an aroma of black tea with a dominant note of freshness.

EXAMPLE 8

An aqueous alcoholic solution containing 350 mg per liter of an aromatising agent, consisting of 2 parts of methyl anthranilate, 1 part of geranyl acetone and 4 parts of γ-valerolactone (1.5 ppm of anthranilate), is added in a quantity of 30 ml to 2 kg of an instant tea powder, followed by homogenisation for 10 minutes at 30° C. in a rotating cylinder. 1% of this powder is removed and has 6.5 liters of hot water added to it, followed by stirring. After dissolution, this tea is submitted to the tasters. 8 tasters out of 8 preferred this aromatised tea, describing it as finer, more intense and more like "black tea" than the reference tea.

EXAMPLE 9

15 ml of an aqueous alcoholic solution containing 200 mg per liter of methyl anthranilate (3 ppm of anthranilate) are added to one 1 kg fraction of an instant tea powder. The same volume of an aqueous alcoholic solution containing 200 mg per liter of geranyl acetone is added to another fraction of the same weight. The two fractions (1.5 ppm of anthranilate) are then mixed and homogenised for 10 minutes. 1% of this mixture is removed and 6.5 liters of hot water added to it, followed by stirring up to dissolution. 4 tasters out of 5 preferred the aromatised tea, describing it as extremely intense, but agreeably flowery and "jasmine-like".

EXAMPLE 10

5 ml of an aqueous alcoholic solution containing 300 mg per liter of methyl anthranilate (75 ppm) are added to a fraction of 20 g of instant tea powder. This fraction dissolves. 30 ml of an aqueous alcoholic solution containing 5 g per liter of lactone of jasmine are added to another fraction (1980 g) of this powder. The "liquid fraction" is then added to the solid fraction, followed by homogenisation for 10 minutes at 20° C. The anthranilate concentration is then 0.75 ppm (the lactone of jasmine concentration being approximately 75 ppm). 1% of the powder thus treated is then removed and 6.5 liters of hot water added to it, followed by stirring up to dissolution. 9 tasters out of 9 preferred the aromatised tea.

EXAMPLE 11

Fractions of 1 kg of tea powder are aromatised to excess in accordance with the instructions of the following Table:

| Fraction No. | Aromatising agent | Concentration, of aromatising agent in the aqueous alcoholic solution g/l | Quantity of solution added ml |
|---|---|---|---|
| I | methyl anthranilate | 6.67 | 15 |
| II | geranyl acetone | 6.67 | 15 |
| III | γ-valerolactone | 20 | 15 |
| IV | linalol | 20 | 15 |
| V | oxide of linalol | 20 | 15 |
| VI | lactone of jasmine | 20 | 15 |
| VII | linalol:oxide of linalol:hexen-2-al 4:1:1 | 60 | 15 |

Some of these fractions are then mixed in the following proportions:

| Fraction No. | Quantity Used in g |
|---|---|
| I | 15 |
| II | 7 |
| III | 10 |
| IV | 400 |
| V | 200 |

This mixture is then homogenised and made up to 2 kg by adding non-aromatised tea powder, followed by rehomogenisation. The concentration of methyl anthranilate is then 0.75 ppm. 1% of the 2 kg of aromatised and homogenised powder is then removed and 6.5 liters of hot water added to it with stirring up to complete dissolution. 14 tasters out of 14 preferred the aromatised tea.

EXAMPLE 12

Some of the fractions mentioned in the Table in the preceding Example and a fraction of non-aromatised powder are mixed in the following proportions:

| Fraction No. | Quantity Used in g |
| --- | --- |
| I | 20 |
| II | 10 |
| III | 10 |
| VI | 160 |
| VII | 600 |
| non-aromatised powder | 1200 |

This mixture is homogenised. The concentration of methyl anthranilate is then 1 ppm. 1% of this aromatised, homogenised powder is then removed and 6.5 liters of hot water added to it. After complete dissolution, this instant tea is submitted to a jury of 14 tasters, 11 of whom preferred it to the reference tea.

EXAMPLE 13

14 ml of an aqueous alcoholic solution containing 200 mg per liter of a 1:1 mixture of ethyl anthranilate and δ-decalactone (1.4 ppm of ethyl anthranilate), are added to 5.7 liters of an extract of tea solids containing approximately 350 g per liter of dry solids, obtained in the usual way by extracting with hot water tea leaves which had been treated beforehand by entrainment with steam to extract the aromas, followed by addition of the condensation solution of the aromas extracted at the beginning of the operation. After homogenisation, the mixture is dried, giving approximately 2 kg of tea powder. 20 g of this powder are dissolved in 6.5 liters of hot water. 4 tasters out of 5 preferred the tea thus aromatised.

EXAMPLE 14

3 fractions of an instant tea powder weighing 100 g, 200 g and 1700 g, respectively, are prepared. 10 ml of an aqueous alcoholic solution containing 300 mg per liter of geranyl acetone are added to the 100 g fraction, and 20 ml of an aqueous alcoholic solution containing 300 mg per liter of δ-decalactone (30 ppm) are added to the 200 g fraction. These two fractions are then combined along with the 1700 g fraction of nonaromatised powder. The whole is homogenised. The concentration of δ-decalactone is then 3 ppm. 1% of the aromatised and homogenised powder is then removed and 6.5 liters of hot water added to it, followed by stirring up to dissolution. 9 tasters out of 10 preferred the aromatised tea, describing it as having a very balanced aroma with an agreeably astringent, but non-bitter flavour. For the same level of aromatisation, the gap between the aromatised tea and the reference narrows down if the relative proportion of geranyl acetone decreases, whilst a higher relative proportion of this ketone produces an unpleasant, bitter note.

We claim:

1. Process for preparing a tea composition, which comprises adding methyl anthranilate to soluble tea solids as an aromatizing agent in an amount of from about 0.25 to about 3 ppm, based on the weight of the soluble tea solids.

2. Process according to claim 1, wherein the amount of methyl anthranilate added to the soluble tea solids is from about 0.5 to about 2 ppm, based on the weight of the soluble tea solids.

3. Process according to claim 1, which comprises additionally adding a second aromatizing agent to said soluble tea solids which includes from about 0.1 to about 10 parts by weight of δ-decalactone per part by weight of added alkyl anthranilate.

4. Process according to claim 2, which comprises additionally adding to said soluble tea solids a second aromatizing agent which includes from about 5 to about 500 parts by weight of lactone of jasmine, per part by weight of added alkyl anthranilate.

5. A tea composition, comprising soluble tea solids and from about 0.25 to about 3 ppm methyl anthranilate as an aromatizing agent, based on the weight of the soluble tea solids.

6. A tea composition according to claim 5 containing from about 0.5 to about 2 ppm methyl anthranilate, based on the weight of the soluble tea solids.

7. A tea composition according to claim 6, which additionally contains a second aromatizing agent which includes from about 0.1 to about 10 parts by weight of added δ-declactone per part by weight of added alkyl anthranilate.

8. A tea composition according to claim 6, which additionally contains a second aromatizing agent which includes from about 5 to about 500 parts by weight of added lactone of jasmine per part by weight of added alkyl anthranilate.

9. A tea composition according to claim 5, which additionally contains a second aromatizing agent which includes from about 0.5 to about 2 parts by weight of geranyl acetone per part by weight of methyl anthranilate.

10. A tea composition according to claim 9, which additionally contains a third aromatizing agent which includes from about 1 to about 2 parts by weight of added γ-valerolactone per part by weight of added combined methyl anthranilate and geranyl acetone.

11. Process for preparing a tea composition, which comprises adding to soluble tea solids methyl anthranilate as an aromatizing agent in an amount of from about 0.5 to about 2 ppm, based on the weight of the soluble tea solids and from about 0.5 to about 2 parts by weight of geranyl acetone per part by weight of added methyl anthranilate as a second aromatizing agent.

12. Process according to claim 11, which comprises additionally adding a third aromatizing agent to said soluble tea solids which includes from about 1 to about 2 parts by weight of γ-valerolactone per part by weight of combined methyl anthranilate and geranyl acetone.

13. Process for preparing a tea composition, which comprises adding to soluble tea solids as an aromatizing agent, an alkyl anthranilate consisting essentially of methyl anthranilate and one or more members of the group consisting of ethyl anthranilate, propyl anthranilate, methyl N-methyl anthranilate and methyl N,N-dimethyl anthranilate, the total amount of said added aromatizing agent being from about 0.25 to about 3 ppm, based on the weight of the soluble tea solids.

14. Process according to claim 13, wherein the total amount of said added aromatizing agent is from about 0.5 to about 2 ppm, based on the weight of the soluble tea solids.

15. Process according to claim 14, which comprises additionally adding a second aromatizing agent to said soluble tea solids which includes from about 0.5 to about 2 parts by weight of geranyl acetone per part by weight of added alkyl anthranilate.

16. Process according to claim 14, which comprises additionally adding a second aromatizing agent to said soluble tea solids which includes from about 0.1 to about 10 parts by weight of δ-decalactone per part by weight of added alkyl anthranilate.

17. Process according to claim 14, which comprises additionally adding to said soluble tea solids a second aromatizing agent which includes from about 5 to about 500 parts by weight of lactone of jasmine, per part by weight of added alkyl anthranilate.

18. Process according to claim 13, which comprises additionally adding a second aromatizing agent to said soluble tea solids which includes from about 0.5 to about 2 parts by weight of geranyl acetone per part by weight of added alkyl anthranilate.

19. Process according to claim 13, which comprises additionally adding a second aromatizing agent to said soluble tea solids which includes from about 0.1 to about 10 parts by weight of δ-decalactone per part by weight of added alkyl anthranilate.

20. Process according to claim 13, which comprises additionally adding to said soluble tea solids a second aromatizing agent which includes from about 5 to about 500 parts by weight of lactone of jasmine, per part by weight of added alkyl anthranilate.

21. A tea composition, comprising soluble tea solids and an added aromatizing agent consisting essentially of methyl anthranilate and one or more members of the group consisting of ethyl anthranilate, propyl anthranilate, methyl N-methyl anthranilate and methyl N,N-dimethyl anthranilate, the total amount of said added aromatizing agent being from about 0.25 to about 3 ppm, based on the weight of the soluble tea solids.

22. A tea composition according to claim 21, wherein the total amount of said added aromatizing agent is from about 0.5 to about 2 ppm, based on the weight of the soluble tea solids.

23. A tea composition according to claim 22, which additionally contains a second aromatizing agent which includes from about 0.5 to about 2 parts by weight of added geranyl acetone per part by weight of added alkyl anthranilate.

24. A tea composition according to claim 23, which additionally contains a third aromatizing agent which includes from about 1 to about 2 parts by weight of added γ-valerolactone per part by weight of added combined alkyl anthranilate and geranyl acetone.

25. A tea composition according to claim 22, which additionally contains a second aromatizing agent which includes from about 0.1 to about 10 parts by weight of added δ-declactone per part by weight of added alkyl anthranilate.

26. A tea composition according to claim 22, which additionally contains a second aromatizing agent which includes from about 5 to about 500 parts by weight of added lactone of jasmine per part by weight of added alkyl anthranilate.

27. A tea composition according to claim 21, which additionally contains a second aromatizing agent which includes from about 0.5 to about 2 parts by weight of added geranyl acetone per part by weight of added alkyl anthranilate.

28. A tea composition according to claim 27, which additionally contains a third aromatizing agent which includes from about 1 to about 2 parts by weight of added δ-valerolactone per part by weight of added combined alkyl anthranilate and geranyl acetone.

29. A tea composition according to claim 21, which additionally contains a second aromatizing agent which includes from about 0.1 to about 10 parts by weight of added δ-declactone per part by weight of added alkyl anthranilate.

30. A tea composition according to claim 21, which additionally contains a second aromatizing agent which includes from about 5 to about 500 parts by weight of added lactone of jasmine per part by weight of added alkyl anthranilate.

* * * * *

UNITED STATES PATENT AND TRADEMARK OFFICE
CERTIFICATE OF CORRECTION

PATENT NO. : 4,297,380
DATED : October 27, 1981
INVENTOR(S) : Ian Horman and Paul Cazenave It is certified that error appears in the above—identified patent and that said Letters Patent is hereby corrected as shown below:

On the title page, the following should be present: -- Foreign Application Data, November 23, 1973, Switzerland ..... 16,515/73 --.

Column 4, line 27, "$\gamma$-decalactone" should read -- $\delta$-decalactone --.

Column 8, line 38, third heading in the first table of Example 11, "Concentration," should read -- Concentration --.

Column 10, line 1 of claim 3, "claim 1" should read -- claim 2 --.

Column 8, first table appeading in Example 11, under the heading "Aromatizing agent", "hexen-2-al" should read -- 2-hexenal --.

Signed and Sealed this

Second Day of February 1982

[SEAL]

Attest:

GERALD J. MOSSINGHOFF

Attesting Officer

Commissioner of Patents and Trademarks